US011442650B2

(12) United States Patent
Huang et al.

(10) Patent No.: US 11,442,650 B2
(45) Date of Patent: Sep. 13, 2022

(54) GENERATING PREDICTED USAGE OF STORAGE CAPACITY

(71) Applicant: EMC IP Holding Company LLC, Hopkinton, MA (US)

(72) Inventors: Jie Huang, Chengdu (CN); Xudong Wang, Zi Yang (CN); Ming Wang, Chengdu (CN); Xiaoyu Ren, Du Jiangyan (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 26 days.

(21) Appl. No.: 16/825,065

(22) Filed: Mar. 20, 2020

(65) Prior Publication Data
US 2020/0348879 A1    Nov. 5, 2020

(30) Foreign Application Priority Data
Apr. 30, 2019    (CN) .......................... 201910361510.4

(51) Int. Cl.
*G06F 3/06*    (2006.01)
(52) U.S. Cl.
CPC .......... *G06F 3/0649* (2013.01); *G06F 3/0613* (2013.01); *G06F 3/0616* (2013.01); *G06F 3/0653* (2013.01); *G06F 3/0673* (2013.01)

(58) Field of Classification Search
CPC .... G06F 3/0649; G06F 3/0613; G06F 3/0616; G06F 3/0653; G06F 3/0673; G06F 11/34–3466; G06N 3/08; G06N 3/0481; G06N 5/02; G06N 20/00
See application file for complete search history.

(56) References Cited

U.S. PATENT DOCUMENTS

| 9,846,478 B1 | 12/2017 | Hulbert et al. | |
| 10,146,449 B1 | 12/2018 | Labonte et al. | |
| 10,146,450 B1 | 12/2018 | Lin et al. | |
| 2004/0193827 A1* | 9/2004 | Mogi | G06F 11/3433 |
| | | | 711/170 |
| 2007/0018601 A1* | 1/2007 | Steinbach | G06F 11/3447 |
| | | | 318/568.11 |

(Continued)

OTHER PUBLICATIONS

Brownlee, Jason. "How to Implement the Backpropagation Algorithm From Scratch In Python". Published Nov. 7, 2016. Updated Mar. 13, 2018. <https://web.archive.org/web/20180313000249/https://machinelearningmastery.com/implement-backpropagation-algorithm-scratch-python/>. (Year: 2018).*

(Continued)

*Primary Examiner* — Charles Rones
*Assistant Examiner* — Hewy H Li
(74) *Attorney, Agent, or Firm* — BainwoodHuang (57) ABSTRACT

Storage management techniques involve: obtaining a historical usage of storage capacity for a storage device, and a historical feature characterizing the historical usage of storage capacity; generating a predicted usage of storage capacity for the storage device based on the historical feature and a predictor for predicting a usage of storage capacity; and updating the predictor by comparing the historical usage of storage capacity with the predicted usage of storage capacity. Therefore, such techniques can accurately predict the usage of storage capacity for the storage device.

18 Claims, 3 Drawing Sheets

(56) References Cited

U.S. PATENT DOCUMENTS

| | | | |
|---|---|---|---|
| 2014/0244643 A1* | 8/2014 | Basak | G06F 16/217 707/737 |
| 2019/0385045 A1* | 12/2019 | Poovalapil | G06F 3/0616 |
| 2020/0133845 A1* | 4/2020 | Kim | G06F 12/121 |

OTHER PUBLICATIONS

"List the Available CloudWatch Metrics for Your Instances". Amazon. Published May 8, 2018. <https://web.archive.org/web/20180508045012/https://docs.aws.amazon.com/AWSEC2/latest/UserGuide/viewing_metrics_with_cloudwatch.html>. (Year: 2018).*

Frey, Stefan, et al. "Cloud Storage Prediction with Neural Networks." Cloud Computing (2015): 52-56. (Year: 2015).*

Song, Binbin, et al. "Host load prediction with long short-term memory in cloud computing." The Journal of Supercomputing 74.12 (2018): 6554-6568. (Year: 2018).*

Erradi, Abdelkarim, and Hisham A. Kholidy. "An efficient hybrid prediction approach for predicting cloud consumer resource needs." 2016 IEEE/ACS 13th International Conference of Computer Systems and Applications (AICCSA). IEEE, 2016. (Year: 2016).*

* cited by examiner

GENERATING PREDICTED USAGE OF STORAGE CAPACITY

CROSS REFERENCE TO RELATED APPLICATION

This application claims priority to Chinese Patent Application No. CN201910361510.4, on file at the China National Intellectual Property Administration (CNIPA), having a filing date of Apr. 30, 2019, and having "METHOD, DEVICE AND COMPUTER PROGRAM PRODUCT FOR STORAGE MANAGEMENT" as a title, the contents and teachings of which are herein incorporated by reference in their entirety.

FIELD

Embodiments of the present disclosure generally relate to the storage field, and more specifically, to a method, device and computer program product for storage management.

BACKGROUND

With the development of storage technologies, to accurately predict the capacity usage and performance of a storage device is of vital importance. In a traditional storage system, a large amount of data with a cyclic pattern is usually used for predicting. However, such methods cannot be flexibly applicable to data without a cyclic pattern, and cannot predict the early capacity usage and performance of a storage device.

SUMMARY

Embodiments of the present disclosure provide a method, device and computer program product for storage management.

In a first aspect of the present disclosure, a method for storage management is provided. The method includes: obtaining a historical usage of storage capacity for a storage device, and a historical feature characterizing the historical usage of storage capacity; generating a predicted usage of storage capacity for the storage device based on the historical feature and a predictor for predicting a usage of storage capacity; and updating the predictor by comparing the historical usage of storage capacity with the predicted usage of storage capacity.

In a second aspect of the present disclosure, a method for storage management is provided. The method includes: obtaining a feature characterizing a usage of storage capacity for a storage device; and predicting the usage of storage capacity for the storage device based on the feature and a predictor updated by a method according to the first aspect of the present disclosure.

In a third aspect of the present disclosure, a device for storage management is provided. The device includes at least one processing unit and at least one memory. The at least one memory is coupled to the at least one processing unit and stores instructions executed by the at least one processing unit. The instructions, when executed by the at least one processing unit, cause the device to perform acts including: obtaining a historical usage of storage capacity for a storage device, and a historical feature characterizing the historical usage of storage capacity; generating a predicted usage of storage capacity for the storage device based on the historical feature and a predictor for predicting a usage of storage capacity; and updating the predictor by comparing the historical usage of storage capacity with the predicted usage of storage capacity.

In a fourth aspect of the present disclosure, a device for storage management is provided. The device includes at least one processing unit and at least one memory. The at least one memory is coupled to the at least one processing unit and stores instructions executed by the at least one processing unit. The instructions, when executed by the at least one processing unit, cause the device to perform acts including: obtaining a feature characterizing a usage of storage capacity for a storage device; and predicting the usage of storage capacity for the storage device based on the feature and a predictor updated by a method according to the first aspect of the present disclosure.

In a fifth aspect of the present disclosure, a computer program product is provided. The computer program product is tangibly stored on a non-transient computer readable medium and includes machine executable instructions which, when executed, cause the machine to implement a method according to the first aspect of the present disclosure.

In a sixth aspect of the present disclosure, a computer program product is provided. The computer program product is tangibly stored on a non-transient computer readable medium and includes machine executable instructions which, when executed, cause the machine to implement a method according to the second aspect of the present disclosure.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference numeral usually refers to the same component in the example embodiments of the present disclosure.

Throughout the figures, the same or corresponding numeral refers to the same or corresponding part.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The preferred embodiments of the present disclosure will be described in more details with reference to the drawings. Although the drawings illustrate the preferred embodiments of the present disclosure, it should be appreciated that the present disclosure can be implemented in various manners and should not be limited to the embodiments explained herein. On the contrary, the embodiments are provided to make the present disclosure more thorough and complete, and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can include other explicit and implicit definitions.

Traditionally, the Seasonal Trend Decomposition (STL) method is used to predict the usage of storage capacity and performance of a storage device. For example, the method may predict the usage of storage capacity and performance of a storage device based on its at least 15 days of historical data. In the method, a set of time series data is decomposed into three parts: trend, seasonality (cyclicity), and remainder (noise), and then these parts are combined together to form a prediction for the future trend.

In the STL method, history data used for prediction needs to be cyclic, in order to accurately predict future trends. However, even if a user's usage of a storage device does in general follow a cyclic pattern, there is no guarantee that such a cyclic usage pattern is always kept and is followed by every single user for the storage device. Therefore, the method cannot flexibly adapt to arbitrary usage patterns for the storage device.

In addition, the STL method further requires a large amount of historical data, for example at least 15 days of historical data, in order to predict the usage storage capacity and performance for the storage device. As a result, the usage of storage capacity and performance for the storage device for the first 15 days cannot be predicted.

To at least partly solve one or more of the above and other potential problems, example embodiments of the present disclosure propose a solution for storage management. In the solution, historical usage of storage capacity for a storage device and a historical feature characterizing (or identifying) the historical usage of storage capacity are first obtained. For example, historical usage of storage capacity for a storage device and historical features may be sampled at time intervals of 5 minutes, so as to obtain the historical usage of storage capacity and the historical feature. Then, the obtained historical usage of storage capacity and historical feature are normalized, and the normalized historical usage of storage capacity and historical feature are transformed to a pair of historical usage of storage capacity and historical feature. For example, historical features within the time intervals 1-20 and historical usage of storage capacity within the time intervals 21-40 form pairs.

Pairs of historical usage of storage capacity and historical features are divided into a training dataset and a test dataset. Pairs of historical usage of storage capacity and historical features in the training dataset are used to train a predictor for predicting usage of storage capacity. The predictor may be a neural network which can be trained for prediction, e.g. a Long Short-Term Memory (LSTM) neural network. Specifically, historical features in the training dataset are input to the predictor, the predictor outputs predicted usage of storage capacity, and the predictor is updated by comparing the predicted usage of storage capacity with historical usage of storage capacity corresponding to the input historical feature in the training dataset.

Next, performance of the updated predictor can be tested using historical usage of storage capacity and historical features in the test dataset. Specifically, historical features in the test dataset are input to the predictor, the predictor outputs predicted usage of storage capacity, and performance of the updated predictor is tested by comparing the predicted usage of storage capacity with historical usage of storage capacity corresponding to the input historical feature in the test dataset.

After obtaining the feature for the storage device, the obtained feature may be input to the trained predictor, so as to predict usage of storage capacity for the storage device. In this way, the present solution can accurately predict usage of storage capacity for the storage device with a reasonable amount of historical data, which does not need to be cyclic. In addition, besides usage of storage capacity, the present solution is also applicable to predict performance for the storage device (such as a cluster, node, application group, virtual machine, volume objects, etc.).

Figure 1:
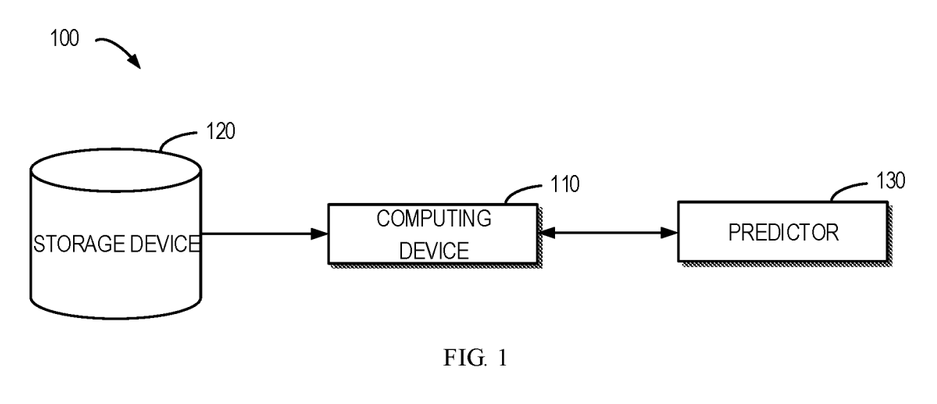
FIG. 1 shows a schematic view of an example of a storage system according to embodiments of the present disclosure.

Specific examples of the present solution are described in more detail below with reference to FIGS. 1-5. FIG. 1 shows a schematic view of an example of a storage system 100 according to embodiments of the present disclosure. The storage system 100 includes a computing device 110, a storage device 120 and a predictor 130. The computing device 110 may include, but not limited to, a cloud computing device, a mainframe, a server, a personal computer, a desktop computer, a laptop computer, a tablet computer, a personal digital assistant, and any other device with computing capability. The storage device 120 may include a cloud storage device, a magnetic storage device, an optical storage device, and any other physical or virtual storage device with storage capability.

The computing device 110 may obtain historical usage of storage capacity for the storage device 120 and a historical feature characterizing the historical usage of storage capacity. For example, the computing device 110 may sample historical usage of storage capacity and historical features for the storage device 120 at time intervals of 5 minutes, so as to obtain the historical usage of storage capacity and the historical feature, e.g. historical features within the time intervals 1-30 and historical usage of storage capacity within the time intervals 21-50.

The historical feature may characterize (or identify or indicate) the historical usage of storage capacity. For example, the historical feature may be an average size of data written for the storage device 120 within a predetermined time interval, a physical space size for the storage device 120 used within the predetermined time interval. In addition, the historical feature may further include a timestamp associated with the predetermined time interval, the timestamp indicating a sampling time point.

The computing device 110 may generate predicted usage of storage capacity for the storage device 120 based on the historical feature and the predictor 130 for predicting usage of storage capacity. For example, the computing device 110 may generate predicted usage of storage capacity within the time intervals 21-40 for the storage device 120 based on historical features within the time intervals 1-20 and the predictor.

The predictor 130 may be used by the computing device 110, and may be implemented inside or outside the computing device 110. The predictor 130 may include, but not limited to, a Long Short-Term Memory (LSTM) neural network. The LSTM neural network is suitable to process time series data, which does not need to be cyclic. The usage of storage capacity (or performance) and feature which are obtained by sampling the storage device 120 by time are time-sensitive, i.e. the sampled usage of storage capacity (or performance) and feature are related to the previously sampled usage of storage capacity (or performance) and feature. Therefore, the LSTM neural network is suitable to predict the usage of storage capacity and feature for the storage device 120.

Then, the computing device 110 may update the predictor 130 by comparing the historical usage of storage capacity with the predicted usage of storage capacity. For example, the computing device 110 may update parameters of the predictor 130 by comparing the historical usage of storage capacity within the time intervals 21-40 and the predicted usage of storage capacity within the time intervals 21-40, so that the predicted usage of storage capacity generated by the predictor 130 is much closer to the real historical usage of storage capacity.

In some embodiments, to test performance of the updated predictor 130, the computing device 110 may obtain a further historical usage of storage capacity for the storage device 120 and a further historical feature characterizing the further historical usage of storage capacity, and generate a further predicted usage of storage capacity for the storage device 120 based on the further historical feature and the updated predictor 130. By comparing the further historical usage of storage capacity with the further predicted usage of storage capacity, the computing device 110 may determine the performance of the updated predictor 130.

For example, the computing device 110 may obtain historical features within the time intervals 11-30 and historical usage of storage capacity within the time intervals 31-50, and generate predicted usage of storage capacity within the time intervals 31-50 based on the historical features within the time intervals 11-30 and the updated predictor 130. Next, the computing device 110 may determine the performance of the updated predictor 130 through errors between the predicted usage of storage capacity and the historical usage of storage capacity within the time intervals 31-50. In some embodiments, the performance may be represented by an average absolute error percentage, and the predictor 130 whose average absolute error percentage is lower than a predetermined threshold may be regarded as a well trained predictor 130.

Thereby, after obtaining the feature for the storage device, the computing device 110 may input the obtained feature to the trained predictor 130, so as to predict a usage of storage capacity for the storage device 120. For example, after obtaining the features within the time intervals 31-50, the computing device 110 may predict future usage of storage capacity within the time intervals 51-70.

In this way, even if the use of the storage device 120 does not follow a cyclic pattern, the present solution can accurately predict a usage of storage capacity for the storage device 120 by using a small amount of time series data. In addition, the trained predictor 130 is also suitable to predict performance for the storage device 120. Therefore, the present solution may also be used to predict performance for the storage device 120.

Figure 2:
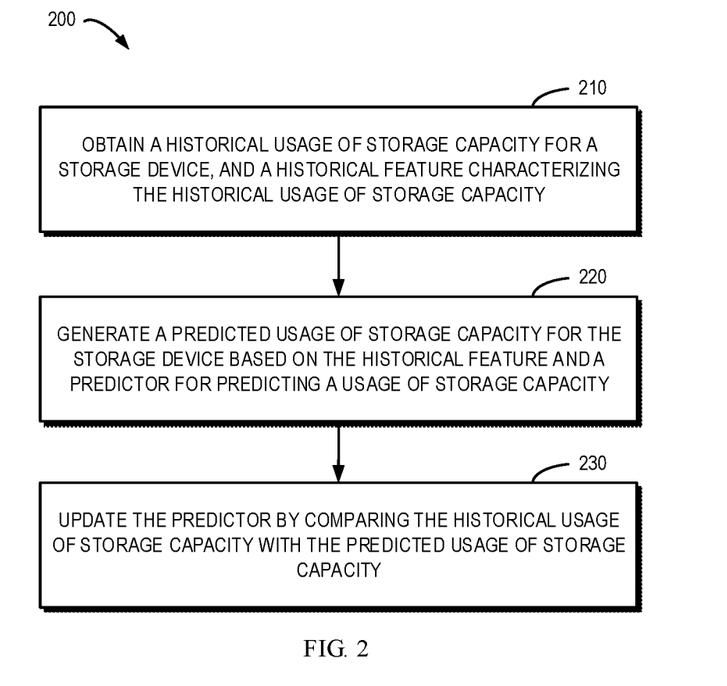
FIG. 2 shows a flowchart of a method for storage management according to embodiments of the present disclosure.

FIG. 2 shows a flowchart of a method 200 for storage management according to embodiments of the present disclosure. For example, the method 200 may be performed by the computing device 110 as shown in FIG. 1. It should be understood the method 200 may further include an additional step which is not shown and/or omit a step which is shown, and the scope of the present disclosure is not limited in this regard.

At 210, the computing device 110 obtains a historical usage of storage capacity for the storage device 120 and a historical feature characterizing the historical usage of storage capacity. For example, the computing device 11 may sample historical usage of storage capacity and historical features for the storage device 120 at time intervals of 5 minutes, so as to obtain the historical usage of storage capacity and the historical feature, e.g. the historical features within the time intervals 1-30 and the historical usage of storage capacity within the time intervals 21-50.

In some embodiments, the computing device 110 may obtain raw data for the storage device which is associated with the historical usage of storage capacity, and determine a feature in the raw data, whose relevance to the historical usage of storage capacity exceeds a predetermined threshold, as the historical feature.

For example, the raw data may include an average size of data written for the storage device 120 within a predetermined time interval, an average number of write operations per second for the storage device 120 within the predetermined time interval, a physical space size for the storage device 120 used within the predetermined time interval, and a timestamp associated with the predetermined time interval. Since the relevance of these data to the usage of storage capacity exceeds the predetermined threshold, these data may be used as features characterizing the usage of storage capacity.

In addition, the raw data may further include, for example, the maximum average read size and the maximum read bandwidth. However, since read operations will not change the usage of storage capacity, the relevance of these data to the usage of storage capacity is lower than the predetermined threshold, and these data will not be used as features characterizing the usage of storage capacity. In this way, a feature that best characterizes the usage of storage capacity may be selected according to relevance of features to the usage of storage capacity.

At 220, the computing device 110 generates a predicted usage of storage capacity for the storage device 120 based on the historical feature and the predictor 130 for predicting a usage of storage capacity. For example, the historical features within the time intervals 1-20 may be input to the predictor 130 such as an LSTM neural network, and the predictor 130 may output the predicted usage of storage capacity within the time intervals 21-40.

In some embodiments, the computing device 110 may normalize the historical feature, and generate the predicted usage of storage capacity by inputting the normalized historical feature to the predictor 130. In this way, different features may be standardized for the purpose of reducing the computation complexity.

At 230, the computing device 110 updates the predictor 130 by comparing the historical usage of storage capacity with the predicted usage of storage capacity. For example, the computing device 110 may update the predictor 130 by comparing the historical usage of storage capacity within the time intervals 21-40 with the predicted usage of storage capacity within the time intervals 21-40.

In some embodiments, when the feature is normalized, the generated predicted usage of storage capacity is a normalized usage of storage capacity. In this case, the computing device 110 may also normalize the predicted usage of storage capacity, and compare the normalized historical usage of storage capacity with the predicted usage of storage capacity.

In some embodiments, to test performance of the updated predictor 130, the computing device 110 may obtain a further historical usage of storage capacity for the storage device 120 and a further historical feature characterizing the further historical usage of storage capacity. For example, the computing device 110 may obtain historical features within the time intervals 11-30 and historical usage of storage capacity within the time intervals 31-50

The computing device 110 may generate a further predicted usage of storage capacity for the storage device 120 based on the further feature and the updated predictor 130. For example, the historical features within the time intervals 11-30 may be input to the updated predictor 130, and the updated predictor 130 may output the predicted usage of storage capacity within the time intervals 31-50.

Then, the computing device may determine the performance of the updated predictor 130 by comparing the further historical usage of storage capacity with the further predicted usage of storage capacity. For example, the computing device 110 may determine the performance of the updated predictor 130 through errors between the predicted usage of storage capacity and the historical usage of storage capacity within the time intervals 31-50. As described above, the performance may be represented by an average absolute error percentage, and the predictor 130 whose average absolute error percentage is lower than a predetermined threshold may be regarded as a well trained predictor 130.

In this way, the predictor 130 may be trained by using a small amount of time-series data, so as to accurately predict a usage of storage capacity and or performance for the storage device 120.

Figure 3:
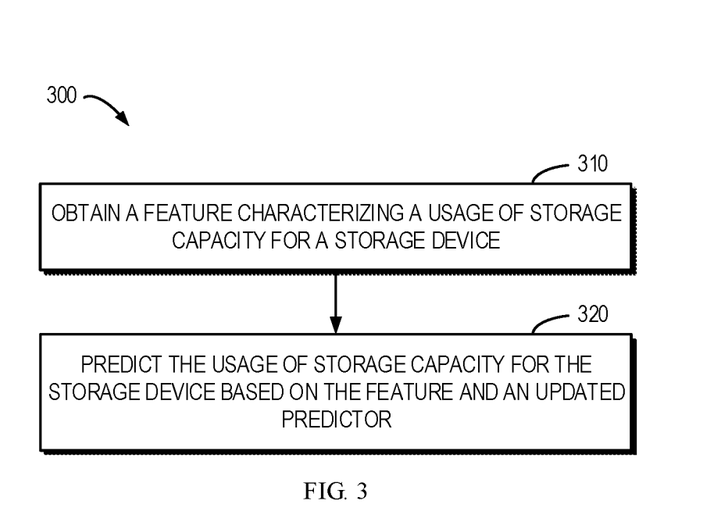
FIG. 3 shows a flowchart of a method for storage management according to embodiments of the present disclosure.

FIG. 3 shows a flowchart of a method 300 for storage management according to embodiments of the present disclosure. For example, the method 300 may be performed by the computing device 110 as shown in FIG. 1. It should be understood the method 300 may further include an additional step which is not shown and/or omit a step which is shown, and the scope of the present disclosure is not limited in this regard.

At 310, the computing device 110 obtains a feature characterizing a usage of storage capacity for a storage device. For example, the computing device 110 may obtain the features within the time intervals 31-50. As described above, the feature may be a feature in raw data, whose relevance to the usage of storage capacity exceeds a predetermined threshold. For example, the feature may include an average size of data written for the storage device 120 within a predetermined time interval, an average number of write operations per second for the storage device 120 within the predetermined time interval, a physical space size for the storage device 120 used within the predetermined time interval, and a timestamp associated with the predetermined time interval.

At 320, the computing device 110 predicts the usage of storage capacity for the storage device 120 based on the obtained feature and the predictor 130 updated according to the method 200. For example, the historical features within the time intervals 31-50 may be input to the updated predictor 130, and the updated predictor 130 may output the predicted usage of storage capacity within the time intervals 51-70.

In some embodiments, the computing device 110 may further normalize the feature, and predict the usage of storage capacity for the storage device 120 based on the normalized feature and the predictor 130 updated according to the method 200.

In this way, the present solution can accurately predict a usage of storage capacity for the storage device 120 by using a small amount of time-series data that is not cyclic. Further, the present solution may also be used to predict performance for the storage device 120.

Figure 4:
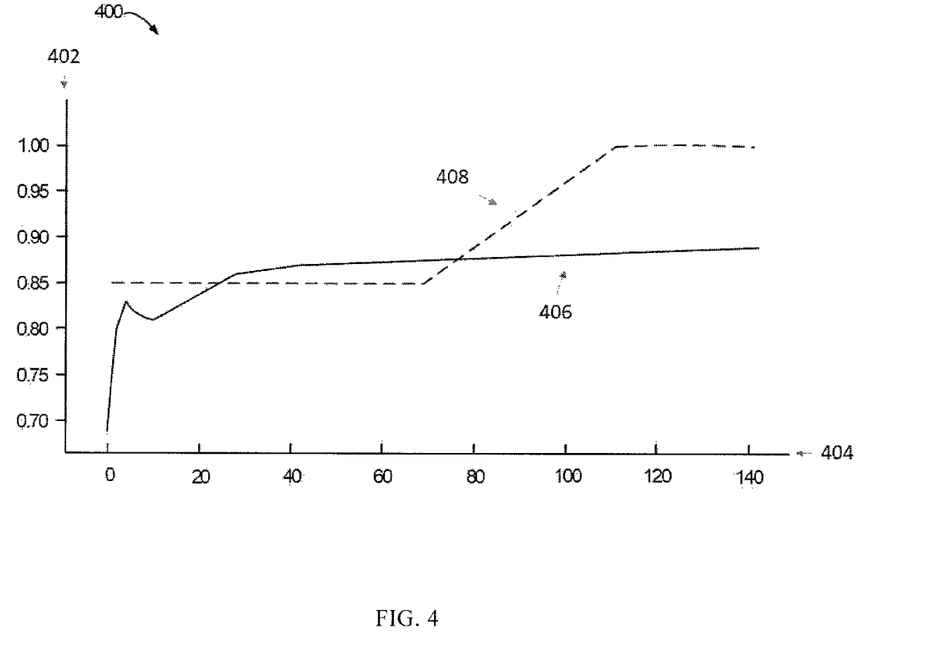
FIG. 4 shows a schematic view of predicted results of usage of storage capacities according to embodiments of the present disclosure.

FIG. 4 shows a schematic view of predicted results 400 of usage of storage capacities according to embodiments of the present disclosure. In the figure, an axis 402 indicates usage of storage capacity, an axis 404 indicates time, a solid line 406 represents predicted usage of storage capacities, and a dashed line 408 represents real usage of storage capacities. As seen from FIG. 4, there is a small error between the predicted usage of storage capacity for the present solution and the real usage of storage capacity.

Figure 5:
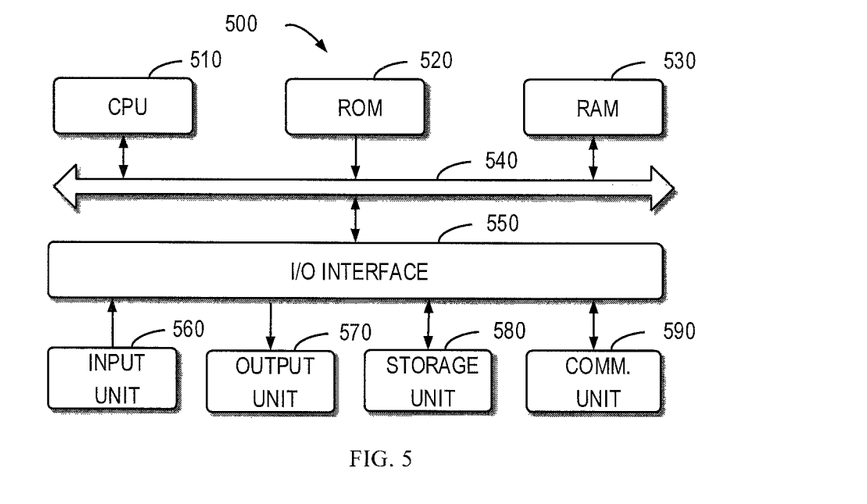
FIG. 5 shows a schematic block diagram of an example device which is applicable to implement embodiments of the present disclosure.

FIG. 5 shows a schematic block diagram of an example device 500 which is applicable to implement embodiments of the present disclosure. For example, the computing device 110 as shown in FIG. 1 may be implemented by the device 500. As depicted, the device 500 includes a central process unit (CPU) 510, which can execute various suitable actions and processing based on the computer program instructions stored in the read-only memory (ROM) 520 or computer program instructions loaded in the random-access memory (RAM) 530 from a storage unit 580. The RAM 530 can also store all kinds of programs and data required by the operations of the device 500. CPU 510, ROM 520 and RAM 530 are connected to each other via a bus 540. The input/output (I/O) interface 550 is also connected to the bus 540.

A plurality of components in the device 500 is connected to the I/O interface 550, including: an input unit 560, such as keyboard, mouse and the like; an output unit 570, e.g., various kinds of display and loudspeakers etc.; a storage unit 580, such as magnetic disk and optical disk etc.; and a communication unit 590, such as network card, modem, wireless transceiver and the like. The communication unit 590 allows the device 500 to exchange information/data with other devices via the computer network, such as Internet, and/or various telecommunication networks.

The above described each procedure and processing, such as the methods 200 and 300, can also be executed by the processing unit 510. For example, in some embodiments, the methods 200 and 300 can be implemented as a computer software program tangibly included in the machine-readable medium, e.g., the storage unit 580. In some embodiments, the computer program can be partially or fully loaded and/or mounted to the device 500 via ROM 520 and/or the communication unit 590. When the computer program is loaded to the RAM 530 and executed by the CPU 510, one or more steps of the above described methods 200 and 300 can be implemented.

The present disclosure can be a method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing devices. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via a network, such as Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages include object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program product according to embodiments of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions specified in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions specified in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions specified in one or more blocks of the flow chart and/or block diagram.

The flow chart and block diagram in the drawings illustrate system architecture, functions and operations that may be implemented by system, method and computer program product according to a plurality of embodiments of the present disclosure. In this regard, each block in the flow chart or block diagram can represent a part of a module, program segment or code, wherein the part of the module, program segment or code include one or more executable instructions for performing specified logic functions. In some alternative embodiments, the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing specified functions or actions, or by a combination of dedicated hardware and computer instructions.

Various embodiments of the present disclosure have been described above, and the above description is only by way of example, rather than exhaustive, and is not limited to the embodiments of the present disclosure. Many modifications and alterations, without deviating from the scope and spirit of the explained various embodiments, are obvious for those of ordinary skill in the art. The selection of terms in the text aims to best explain principles and actual applications of the embodiments and technical improvements made in the market by each the embodiments, or enable other ordinary skilled in the art to understand the embodiments of the present disclosure.

We claim:

1. A method for storage management, comprising:
    obtaining a historical usage of storage capacity for a storage device;
    obtaining, for the storage device, raw data associated with the historical usage of storage capacity;
    determining, as a historical feature characterizing the historical usage of storage capacity, a feature in the raw data, responsive to a relevance of the feature to the historical usage of storage capacity exceeding at least one predetermined threshold, wherein the historical feature comprises an average size of data written for the storage device within a predetermined time interval, a physical space size for the storage device used within the predetermined time interval, and a timestamp associated with the predetermined time interval, wherein the timestamp indicates a sampling time point associated with the predetermined time interval;
    generating a predicted usage of storage capacity for the storage device based on the historical feature and a predictor for predicting a usage of storage capacity; and
    updating the predictor by comparing the historical usage of storage capacity with the predicted usage of storage capacity.

2. The method of claim 1, wherein generating the predicted usage of storage capacity comprises:
    normalizing the historical feature; and
    generating the predicted usage of storage capacity by inputting the normalized historical feature to the predictor.

3. The method of claim 1, wherein comparing the historical usage of storage capacity with the predicted usage of storage capacity comprises:
    normalizing the historical usage of storage capacity; and
    comparing the normalized historical usage of storage capacity with the predicted usage of storage capacity.

4. The method of claim 1, wherein the predictor is a Long Short-Term Memory (LSTM) neural network.

5. The method of claim 1, wherein the historical feature further comprises:
    an average number of write operations per second for the storage device within the predetermined time interval.

6. The method of claim 1, further comprising:
    obtaining a further historical usage of storage capacity for the storage device, and a further historical feature characterizing the further historical usage of storage capacity;
    generating a further predicted usage of storage capacity for the storage device based on the further historical feature and the updated predictor; and
    determining performance of the predictor by comparing the further historical usage of storage capacity and the further predicted usage of storage capacity.

7. A method for storage management, comprising:
    obtaining a feature characterizing a usage of storage capacity for a storage device; and
    predicting the usage of storage capacity for the storage device based on the feature and a predictor updated by a method of storage management which includes:
        obtaining a historical usage of storage capacity for a storage device;
        obtaining, for the storage device, raw data associated with the historical usage of storage capacity;
        determining, as a historical feature characterizing the historical usage of storage capacity, a feature in the raw data, responsive to a relevance of the feature to the historical usage of storage capacity exceeding at least one predetermined threshold, wherein the historical feature comprises an average size of data written for the storage device within a predetermined time interval, a physical space size for the storage device used within the predetermined time interval and a timestamp associated with the predetermined time interval, and wherein the timestamp indicates a sampling time point associated with the predetermined time interval;
        generating a predicted usage of storage capacity for the storage device based on the historical feature and a predictor for predicting a usage of storage capacity; and
        updating the predictor by comparing the historical usage of storage capacity with the predicted usage of storage capacity.

8. The method of claim 7, wherein the feature further comprises:
    an average number of write operations per second for the storage device within the predetermined time interval.

9. A device for storage management, comprising:
    at least one processing unit;
    at least one memory coupled to the at least one processing unit and storing instructions executed by the at least one processing unit, the instructions, when executed by the at least one processing unit, causing the device to perform acts comprising:
        obtaining a historical usage of storage capacity for a storage device;
        obtaining, for the storage device, raw data associated with the historical usage of storage capacity;
        determining, as a historical feature characterizing the historical usage of storage capacity, a feature in the raw data, responsive to a relevance of the feature to the historical usage of storage capacity exceeding at least one predetermined threshold, wherein the historical feature comprises an average size of data written for the storage device within a predetermined time interval, a physical space size for the storage device used within the predetermined time interval and a timestamp associated with the predetermined time interval, and wherein the timestamp indicates a sampling time point associated with the predetermined time interval;
        generating a predicted usage of storage capacity for the storage device based on the historical feature and a predictor for predicting a usage of storage capacity; and
        updating the predictor by comparing the historical usage of storage capacity with the predicted usage of storage capacity.

10. The device of claim 9, wherein generating the predicted usage of storage capacity comprises:
    normalizing the historical feature; and
    generating the predicted usage of storage capacity by inputting the normalized historical feature to the predictor.

11. The device of claim 9, wherein comparing the historical usage of storage capacity with the predicted usage of storage capacity comprises:
  normalizing the historical usage of storage capacity; and
  comparing the normalized historical usage of storage capacity with the predicted usage of storage capacity.

12. The device of claim 9, wherein the predictor is a Long Short-Term Memory (LSTM) neural network.

13. The device of claim 9, wherein the historical feature further comprises:
  an average number of write operations per second for the storage device within the predetermined time interval.

14. The device of claim 9, the acts further comprising:
  obtaining a further historical usage of storage capacity for the storage device, and a further historical feature characterizing the further historical usage of storage capacity;
  generating a further predicted usage of storage capacity for the storage device based on the further historical feature and the updated predictor; and
  determining performance of the predictor by comparing the further historical usage of storage capacity and the further predicted usage of storage capacity.

15. A device for storage management, comprising:
  at least one processing unit;
  at least one memory coupled to the at least one processing unit and storing instructions executed by the at least one processing unit, the instructions, when executed by the at least one processing unit, causing the device to perform acts comprising:
    obtaining a feature characterizing a usage of storage capacity for a storage device; and
    predicting the usage of storage capacity for the storage device based on the feature and a predictor updated by a method of storage management which includes:
      obtaining a historical usage of storage capacity for a storage device;
      obtaining, for the storage device, raw data associated with the historical usage of storage capacity;
      determining, as a historical feature characterizing the historical usage of storage capacity, a feature in the raw data, responsive to a relevance of the feature to the historical usage of storage capacity exceeding at least one predetermined threshold, wherein the historical feature comprises an average size of data written for the storage device within a predetermined time interval, a physical space size for the storage device used within the predetermined time interval and a timestamp associated with the predetermined time interval, and wherein the timestamp indicates a sampling time point associated with the predetermined time interval;
      generating a predicted usage of storage capacity for the storage device based on the historical feature and a predictor for predicting a usage of storage capacity; and
      updating the predictor by comparing the historical usage of storage capacity with the predicted usage of storage capacity.

16. The device of claim 15, wherein the feature further comprises:
  an average number of write operations per second for the storage device within the predetermined time interval.

17. A computer program product having a non-transitory computer readable medium which stores a set of instructions perform storage management; the set of instructions, when carried out by computerized circuitry, causing the computerized circuitry to perform a method of:
  obtaining a historical usage of storage capacity for a storage device;
  obtaining, for the storage device, raw data associated with the historical usage of storage capacity;
  determining, as a historical feature characterizing the historical usage of storage capacity, a feature in the raw data, responsive to a relevance of the feature to the historical usage of storage capacity exceeding at least one predetermined threshold, wherein the historical feature comprises an average size of data written for the storage device within a predetermined time interval, a physical space size for the storage device used within the predetermined time interval and a timestamp associated with the predetermined time interval, and wherein the timestamp indicates a sampling time point associated with the predetermined time interval;
  generating a predicted usage of storage capacity for the storage device based on the historical feature and a predictor for predicting a usage of storage capacity; and
  updating the predictor by comparing the historical usage of storage capacity with the predicted usage of storage capacity.

18. A computer program product having a non-transitory computer readable medium which stores a set of instructions to perform storage management; the set of instructions, when carried out by computerized circuitry, causing the computerized circuitry to perform a method of:
  obtaining a feature characterizing a usage of storage capacity for a storage device; and
  predicting the usage of storage capacity for the storage device based on the feature and a predictor updated by a method of storage management which includes:
    obtaining a historical usage of storage capacity for a storage device;
    obtaining, for the storage device, raw data associated with the historical usage of storage capacity;
    determining, as a historical feature characterizing the historical usage of storage capacity, a feature in the raw data, responsive to a relevance of the feature to the historical usage of storage capacity exceeding at least one predetermined threshold, wherein the historical feature comprises an average size of data written for the storage device within a predetermined time interval, a physical space size for the storage device used within the predetermined time interval and a timestamp associated with the predetermined time interval, and wherein the timestamp indicates a sampling time point associated with the predetermined time interval;
    generating a predicted usage of storage capacity for the storage device based on the historical feature and a predictor for predicting a usage of storage capacity; and
    updating the predictor by comparing the historical usage of storage capacity with the predicted usage of storage capacity.

\* \* \* \* \*